(12) United States Patent
Chaturvedi et al.

(10) Patent No.: US 9,573,610 B1
(45) Date of Patent: Feb. 21, 2017

(54) COLLAPSIBLE TRUNK-ACCESSIBLE CARTS

(71) Applicant: TRUNKFIT LLC, Davie, FL (US)

(72) Inventors: Pankaj Chaturvedi, Davie, FL (US); Joshua C. Simpson, Miami, FL (US)

(73) Assignee: TRUNKFIT, LLC., Davie, FL (US)

( * ) Notice: Subject to any disclaimer, the term of this patent is extended or adjusted under 35 U.S.C. 154(b) by 0 days.

(21) Appl. No.: 15/090,498

(22) Filed: Apr. 4, 2016

Related U.S. Application Data

(60) Provisional application No. 62/142,754, filed on Apr. 3, 2015.

(51) Int. Cl.
*B62B 3/02* (2006.01)
*B62B 3/00* (2006.01)
*B62B 3/08* (2006.01)

(52) U.S. Cl.
CPC .............. *B62B 3/022* (2013.01); *B62B 3/005* (2013.01); *B62B 3/08* (2013.01)

(58) Field of Classification Search
CPC ............ B62B 3/022; B62B 3/02; B62B 3/005; B62B 3/08
See application file for complete search history.

(56) References Cited

U.S. PATENT DOCUMENTS

| | | | | |
|---|---|---|---|---|
| 3,118,553 A * | 1/1964 | Rosenzweig | ......... | B62B 3/1464 280/33.995 |
| RE25,616 E * | 7/1964 | Stanley | ................... | B62B 3/148 186/63 |
| 3,503,622 A * | 3/1970 | Romero | ................... | B62B 3/144 280/33.993 |
| 3,787,063 A * | 1/1974 | Oliver | ..................... | B62B 3/182 186/52 |
| 3,789,957 A * | 2/1974 | Close | ......................... | A47F 9/04 186/63 |
| 3,815,932 A * | 6/1974 | Ruger | ................... | B62B 3/1484 186/63 |
| 4,118,044 A * | 10/1978 | Celms | ................... | B62B 3/1484 186/63 |
| 4,273,346 A * | 6/1981 | Rehrig | ................... | B62B 3/148 220/485 |
| 4,492,388 A * | 1/1985 | de Wit | ..................... | B62B 3/027 248/215 |
| 6,431,319 B1 * | 8/2002 | Myers | ........................ | B62B 3/02 187/243 |
| 7,080,844 B2 * | 7/2006 | Espejo | .................... | B62B 3/027 280/33.995 |
| 8,083,253 B1 * | 12/2011 | Butler | ..................... | B62B 3/027 141/340 |

(Continued)

*Primary Examiner* — Erez Gurari
(74) *Attorney, Agent, or Firm* — Patents on Demand P.A.; Brian K. Buchheit; Scott M. Garrett

(57) ABSTRACT

A collapsible trunk-accessible cart includes a basket that is supported by a set of wheels, and which can be rolled forward and backward on the wheels. The wheels are in turn supported by a pair of cantilever horizontal support arms to which both front and rear legs are attached. The front and rear legs can be folded up over respective sides of the basket. The front legs extend forward at an angle to allow some of the lower portions of the front legs to pass under the rear of a vehicle so that the basket can then be moved into the trunk or cargo area of the vehicle. The basket can be rolled forward into the trunk, while a lift assist mechanism retains the legs to the basket, which can then be folded over the sides of the basket.

16 Claims, 13 Drawing Sheets

(56) References Cited

U.S. PATENT DOCUMENTS

| | | | | |
|---|---|---|---|---|
| 8,172,256 B2* | 5/2012 | Fine | ............... | B62B 3/027 |
| | | | | 280/38 |
| 8,505,933 B2* | 8/2013 | Bernard | ............ | B62B 3/005 |
| | | | | 280/33.995 |
| 8,979,115 B1* | 3/2015 | Baron | ............. | B62B 3/027 |
| | | | | 280/43 |
| 9,211,899 B2* | 12/2015 | Beauchamp | ...... | B62B 5/0003 |
| 9,221,486 B2* | 12/2015 | Fine | ............ | B62B 5/0003 |
| 2010/0096530 A1* | 4/2010 | Chiu | ............. | B25H 1/04 |
| | | | | 248/439 |

\* cited by examiner

COLLAPSIBLE TRUNK-ACCESSIBLE CARTS

CROSS REFERENCE

This application claims priority to provisional application No. 62/142,754, titled "Collapsible Trunk-Accessible Carts," filed Apr. 3, 2015, the entirety of which is hereby incorporated by reference.

FIELD OF THE DISCLOSURE

The present disclosure relates generally to carts used to transport goods to and from a vehicle, and more particularly to carts that assist in loading goods transported in the cart in and out of the trunk or cargo area of a typical passenger vehicle in a way that doesn't require disassembly/re-assembly of the cart.

BACKGROUND

Carts are commonly used to transport goods to, and sometimes from a vehicle. A common example of which is a shopping cart such as those provided by many retailers and grocery stores. A shopper can transport the items they have purchased in the cart to the vehicle, and then transfer the items to their vehicle, leaving the cart behind. The cart belongs to the retailer, and is designed so as to not fit in a vehicle to prevent people from taking the cart away from the retailer's property. When the person then arrives home, or at some other destination for the purchased items, the person must either carry the items, or have a cart at the destination location which can be used to carry the items from the vehicle.

To solve this problem a number of carts have been designed that can be carried in the vehicle. These carts are typically designed to collapse, but they require the user to remove the contents of the cart and transfer them into the vehicle, then collapse and store the cart in the vehicle, and then reverse the process at the destination to unload the vehicle. Some cart designs allow a cart to be placed directly into a rear cargo area of a vehicle, but only if the cart basket can be moved directly into the vehicle. Such designs do not facilitate loading and unloading the cart into a variety of vehicle cargo areas such as trunks and other cargo areas. As such, none of the known cart designs allow the contents of the cart to remain in the cart when the cart is stored in the vehicle, assist in loading the cart and contents into the vehicle, and can accommodate loading into and out of a wide variety of vehicle cargo spaces.

Accordingly, there is a need for a trunk-accessible cart that can assist in loading and unloading the cart and its contents from a variety of vehicle cargo spaces.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
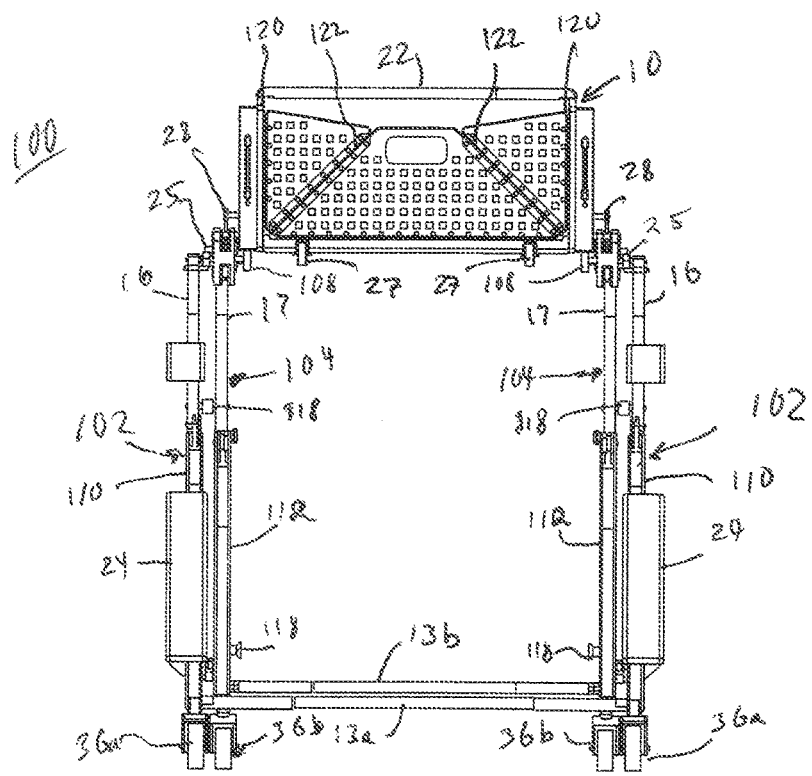
FIG. 1 is a front elevational view of a standing trunk-accessible folding cart, in accordance with some embodiments.
Figure 2:
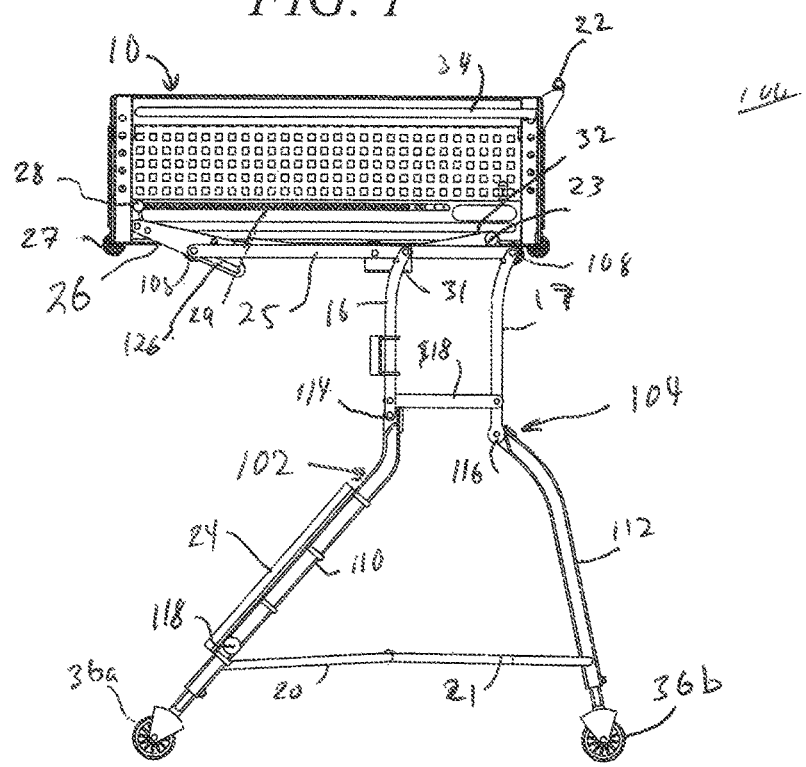
FIG. 2 is a side elevational view of a standing trunk-accessible folding cart, in accordance with some embodiments.
Figure 3:
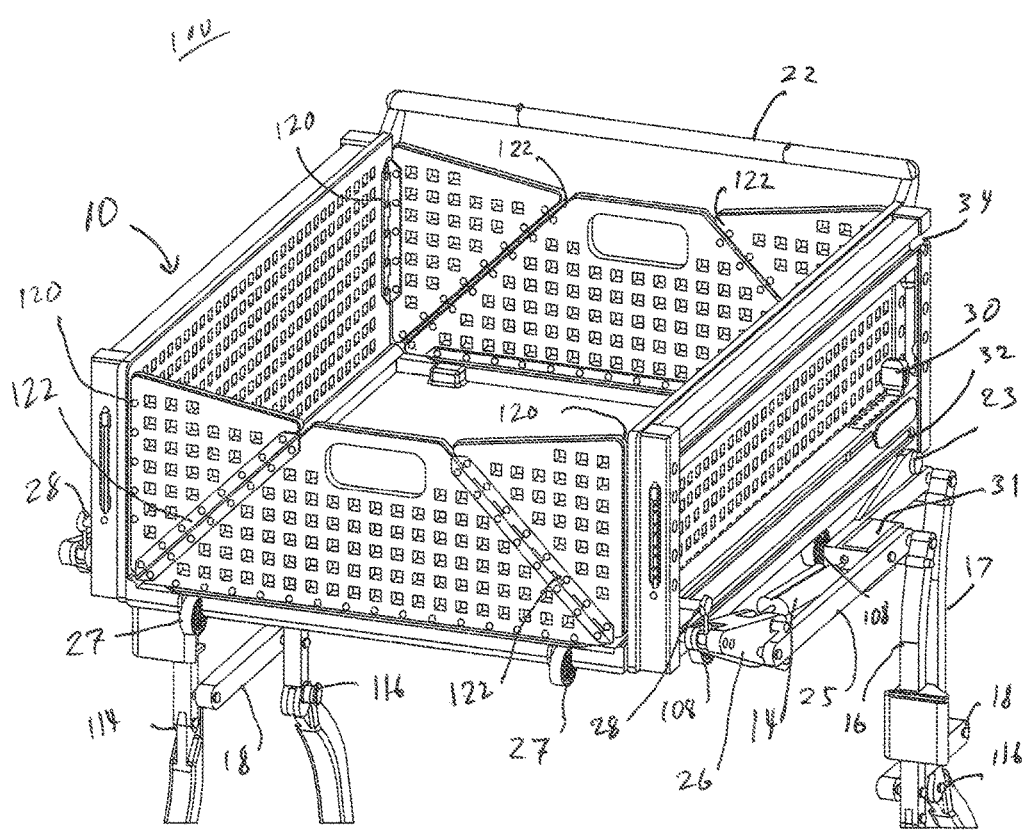
FIG. 3 is an isometric view of a basket and support structure of a standing trunk-accessible folding cart, in accordance with some embodiments.
Figure 4:
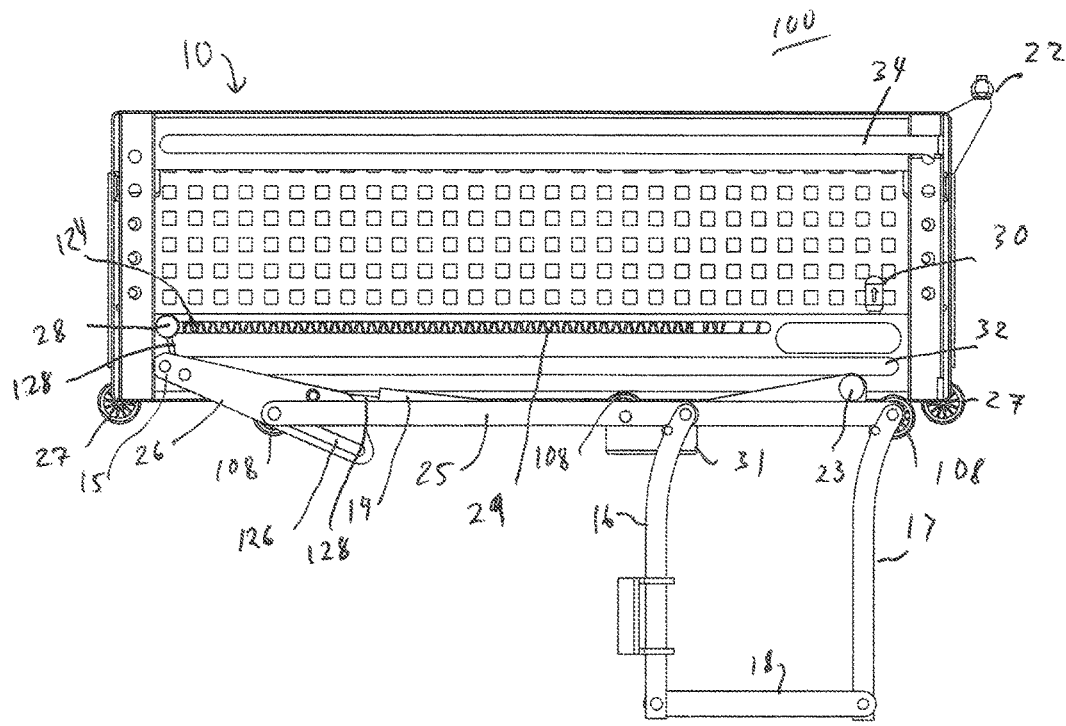
FIG. 4 is a detailed side elevational view of a basket and support structure of a standing trunk-accessible folding cart, in accordance with some embodiments.
Figure 5:
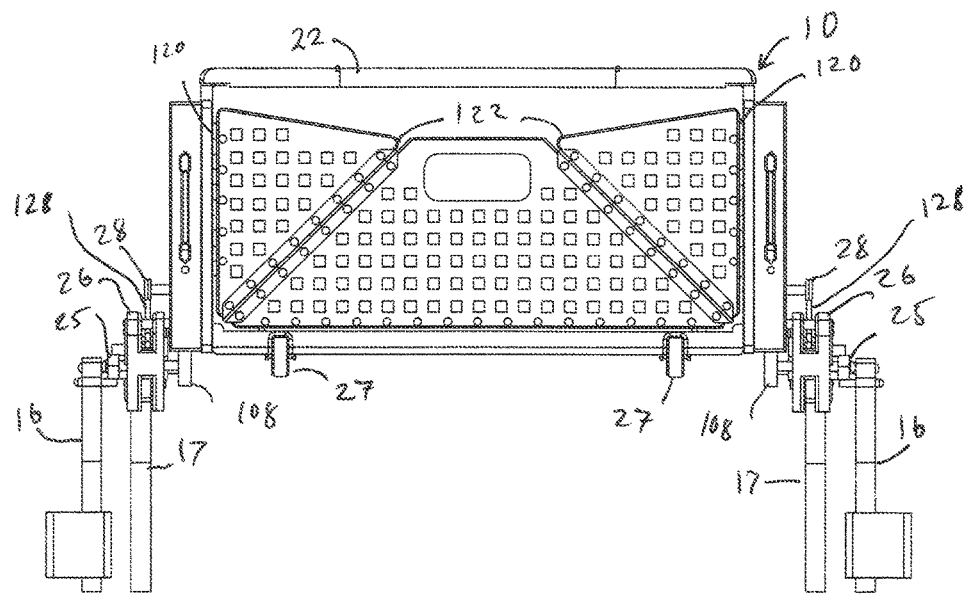
FIG. 5 is a detailed front elevational view of a basket and support structure of a standing trunk-accessible folding cart, in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

The disclosure includes embodiments for a collapsible trunk-accessible cart. Some embodiments can include a basket having a bottom, and front, back, left, and right sides that rise vertically from the bottom. The cart can further include a pair of cantilever horizontal support arms each disposed on a respective one of the right and lefts sides of the basket. Each cantilever horizontal support arm has at least a front wheel and a rear wheel attached at a front portion and a rear portion, respectively, of the cantilever horizontal support arm. The wheels support the basket when the collapsible trunk-accessible cart is in an open configuration. The basket can roll forward and backward on the wheels, when not locked in position. The cart can further include a pair of front legs, each including an upper portion pivotally attached to a respective one of the cantilever horizontal support arms at a point behind a midpoint of the respective cantilever horizontal support arm, and extending downward to a lower portion that is pivotally connected to a lower end of the upper portion and which extends down and forward at an angle, each lower portion terminated with a respective wheel. The cart can further include a pair of rear legs, each including an upper portion pivotally attached at area point of a respective one of the cantilever horizontal support arms and extending downward and pivotally connected to a respective lower portion that extends further downward and terminates with a respective wheel. The cart can further include a pair of slotted lift arms, each mounted on a respective side of the basket, and having first end pivotally attached to a track wheel disposed in a horizontal track on the respective side of basket, and having a second end including a slot through which an axle for the front wheel attached to the respective cantilever horizontal support arm passes. The car can further include a pair of springs, each one mounted in a respective horizontal track on one of the left and right sides of the basket, and having a respective sliding block mounted at a forward end of each spring. The cart can further include a pair of lift assist assemblies, each respectively disposed on one of the left and right sides of the basket, and which are attached by a respective cable system that extends around the respective slotted lift arm to the respective sliding block and to a respective one of the cantilever horizontal support arms. The cantilever horizontal support arms, slotted lift arms, springs, and lift assemblies are configured to allow the basket to be rolled forward over the front wheel of the cantilever horizontal support arms while retaining the cantilever horizontal support arms and the front and rear legs with the basket. The front and rear legs fold their respective lower portions over their respective upper portions horizontally over the respective sides of the basket.

FIGS. 1-5 show several views of a trunk-accessible folding cart 100, in accordance with some embodiments. The cart 100 is designed to facilitate loading and unloading the cart from the cargo area of a vehicle, include the trunk of vehicle. The design of the cart 100 allows a user to load the cart and its contents into the trunk of a vehicle over the rear bumper and lower rim or lip of the trunk, which is typically higher than the floor of the trunk. The support structure of the cart 100 is designed to both support the basket 10 of the cart 100 while pushing the cart 100, as well as during the loading and unloading of the cart 100 into and out of the vehicle cargo area. An integral spring structure assists in the loading and unloading operations. The support structure is able to be folded over the sides of the basket 10 when loaded, and when the basket 10 does not contain items it can be folded flat to reduce the space occupied by the cart.

As shown in the drawings the cart 100 includes an open-top basket 10, a handle bar 22, and is supported by two pairs of collapsible support legs including a pair of front legs 102 and a pair of rear legs 104. The bottom of each leg 102, 104, is a caster 36*a*, 36*b*, respectively. From the front view in FIG. 1 it can be seen that the front legs 102 have a width between the left and right front legs 102 that is wider than the width between the left and right rear legs 104, and there is some clearance between these respective widths such that the inside width between the front legs 102 is wider than the outside width between the rear legs 104. Each of the legs 102, 104 are segmented and articulating. The front legs 102 each have an upper portion 16, and the rear legs 104 each have an upper portion 17. The upper portions 16, 17 are substantially vertical when the legs 102, 104 are extended, and they depend from cantilever horizontal support arms 25 (one on each side of the basket 10). The upper portion 17 of the rear legs 104 are attached at the rear point of the cantilever horizontal support arms 25, while the upper portions 16 of the front legs 102 are attached at a point between a mid-point and the rear point of the horizontal cantilever support arms 25, and they can pivot about their respective attachment points. The horizontal cantilever support arms 25 support the basket 10 on a set of wheels 108 that are attached to the horizontal cantilever support arms 25 with at least two wheels on each of the horizontal cantilever support arms 25. The wheels 108 allow the basket to roll forward and backward as the wheels 108 support the basket 10 on the bottom edges of the basket 10.

The upper portions 16, 17 of the front and rear legs 102, 104, are respectively attached to lower portions 110, 112 at lockable pivot points 114, 116. The upper portions 16, 17 on each side are further connected to each other by a respective pivoting horizontal upper crossbar 18 that is attached at the lower terminus of each upper portion 16, 17, and is free to pivot about each attachment point. A pair of support arms 20, 21 join the lower peg portions 110, 112 to add support at the lower terminus of each lower portion 110, 112. The support arms 20, 21 can be hinged along their length in order to allow folding. The lower leg portions 110, 112 can include telescoping portions that can be locked to a selected height by a plunger and spring type lock 118. The plunger locks 118 each include a rod that passes through openings in two leg members to prevent them from moving with respect to each other. A spring biases the rod into position through both members. The plunger includes a handle portion that can be pulled against the bias of its spring to remove the rod from the inner telescoping member to allow movement of the members relative to each other. Thus, the length of the legs 102, 104 can be adjusted to a desired height, which can be based on, for example, the height of the cargo area of a vehicle into which the collapsible cart 100 can be loaded in and out. When the cart 100 is loaded into a vehicle, as will be illustrated, the legs 102, 104 can be unlocked the pivot points 114, 116 so that the legs can be folded to rear and brought up and over top of the basket 10. On each side of the basket 10 is a horizontal track 124 in which is disposed a spring 29, which can be a multiple compression spring. At the front end of the track 124 a sliding block is seated against the spring 29. The sliding block is connected to a cable 128 that is threaded around a slotted lift arm 26, and the cable 128 is further coupled at its opposite end to a captured spring in a lift assist assembly 14. Thus the cable 128 is sprung at both of its ends. The front end of each cantilever horizontal support arm 25 includes a transverse rod or peg that is captured in a slot 126 in the slotted lift arm 26. The transverse peg can also act as an axle for one of the wheels 108. A weight assist tensioner 30 can be used to adjust tension in the spring 29 while a lift assist tensioner 31 can be used to adjust tension in the lift assist assembly. The slotted lift arms 26 are each attached to a track wheel axle 15 that connects to a captured track wheel in track 32. Thus the point where the axle 15 is located slides along track 32.

Figure 6:
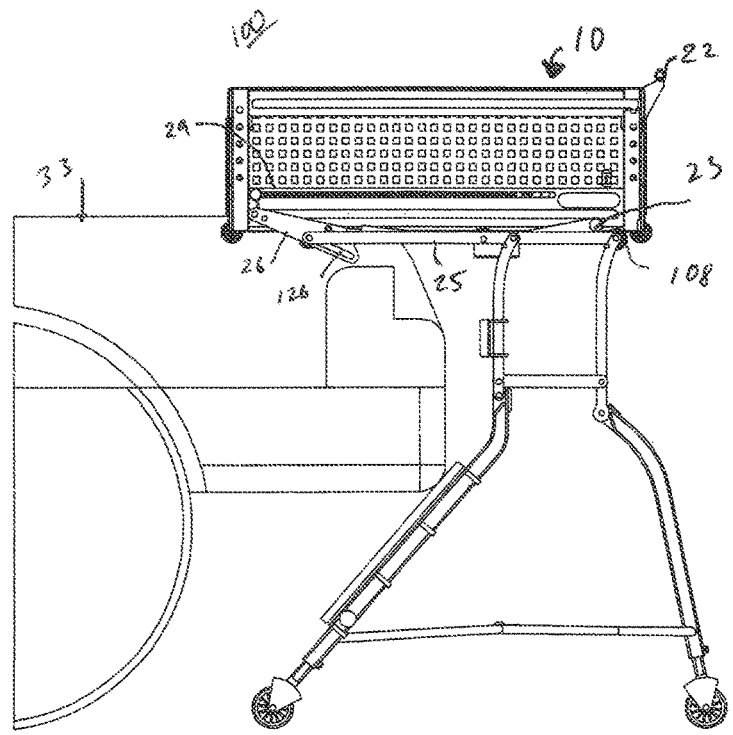
FIG. 6 is a first side view of a trunk-accessible folding cart being loaded into a vehicle cargo space, in accordance with some embodiments.
Figure 7:
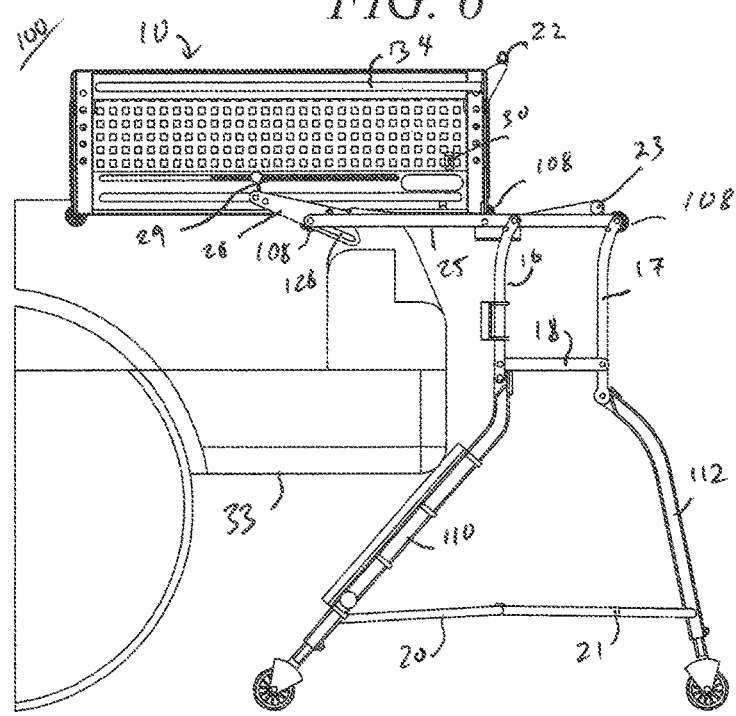
FIG. 7 is a second side view of a trunk-accessible folding cart being loaded into a vehicle cargo space, in accordance with some embodiments.
Figure 8:
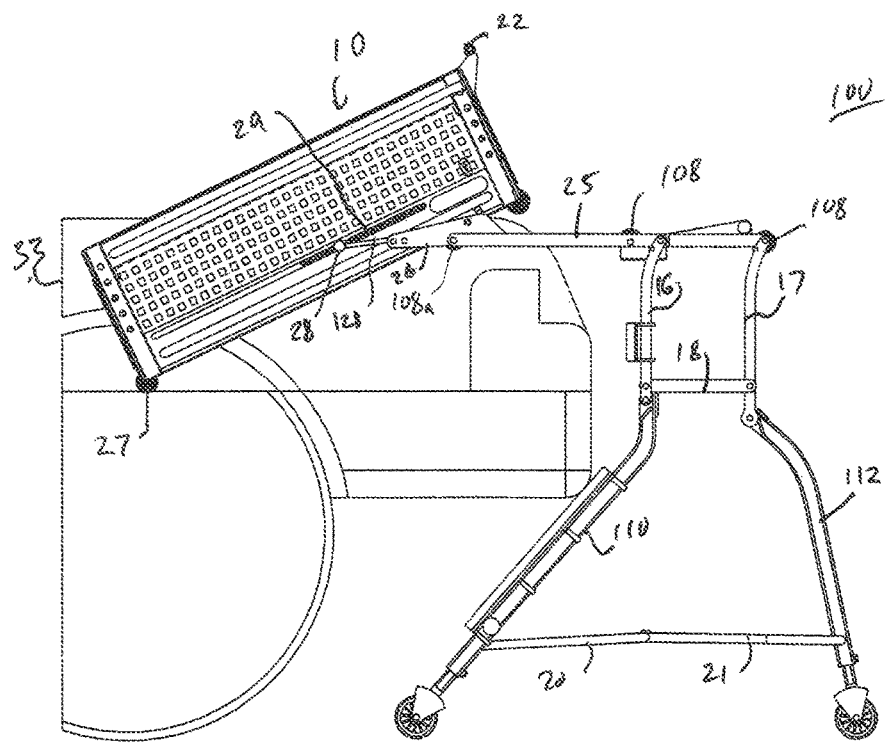
FIG. 8 is a third side view of a trunk-accessible folding cart being loaded into a vehicle cargo space, in accordance with some embodiments.
Figure 9:
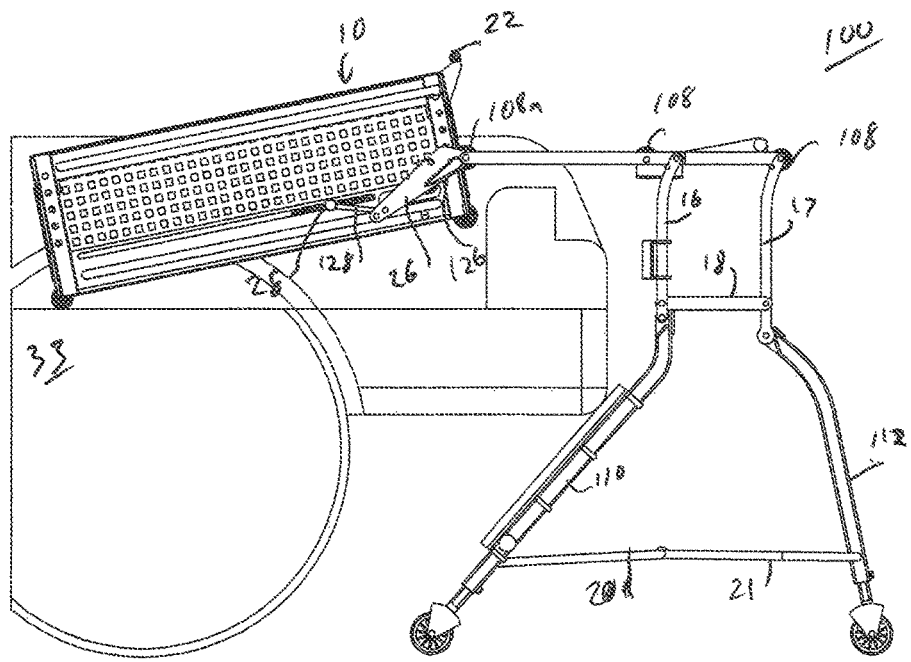
FIG. 9 is a fourth side view of a trunk-accessible folding cart being loaded into a vehicle cargo space, in accordance with some embodiments.
Figure 10:
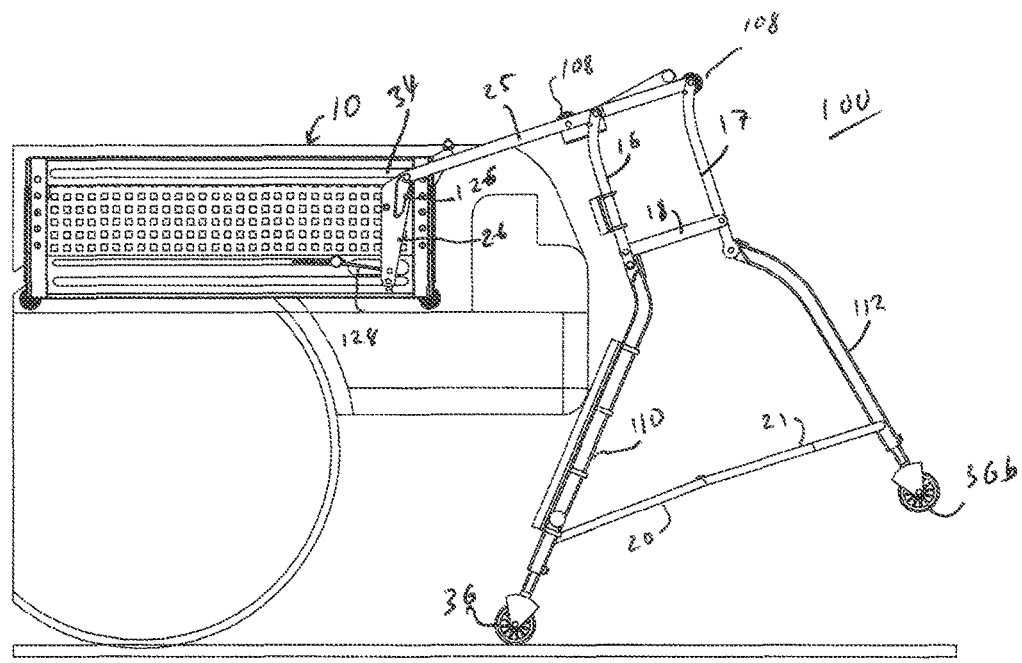
FIG. 10 is a fifth side view of a trunk-accessible folding cart being loaded into a vehicle cargo space, in accordance with some embodiments.
Figure 11:
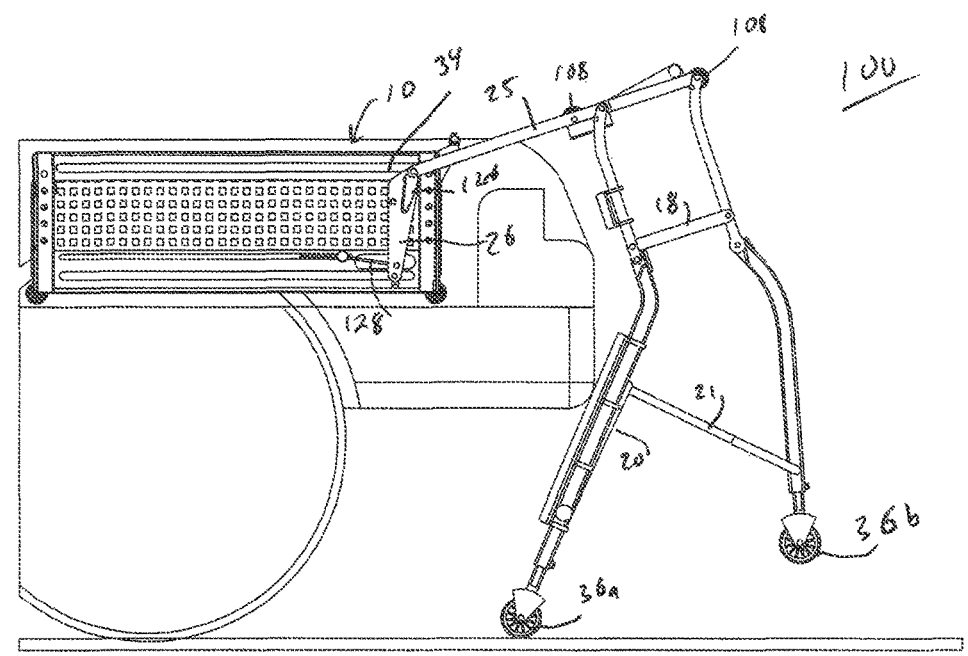
FIG. 11 is a sixth side view of a trunk-accessible folding cart being loaded into a vehicle cargo space, in accordance with some embodiments.
Figure 12:
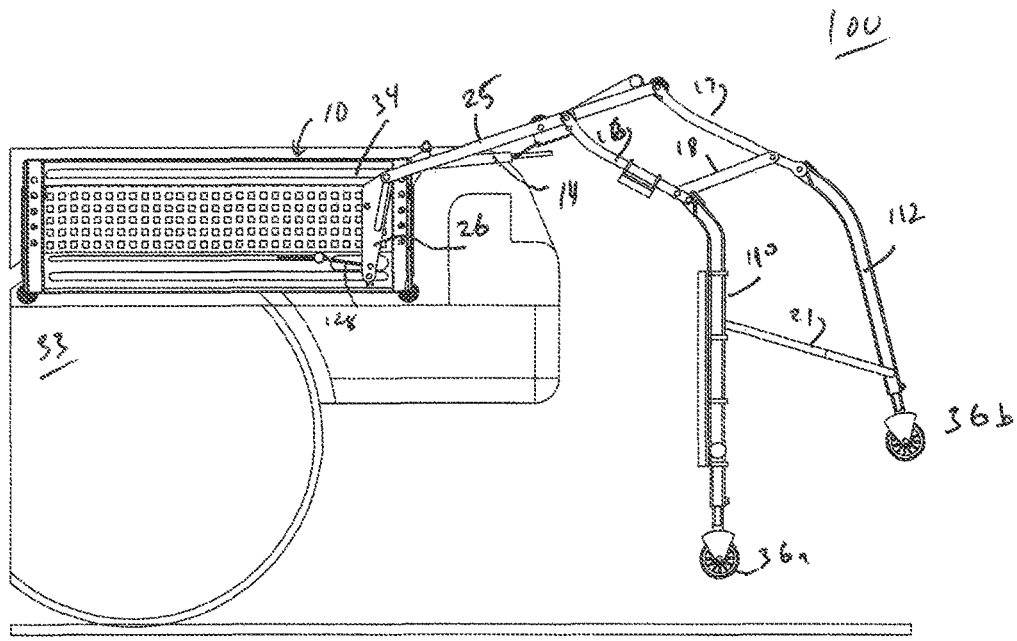
FIG. 12 is a seventh side view of a trunk-accessible folding cart being loaded into a vehicle cargo space, in accordance with some embodiments.
Figure 13:
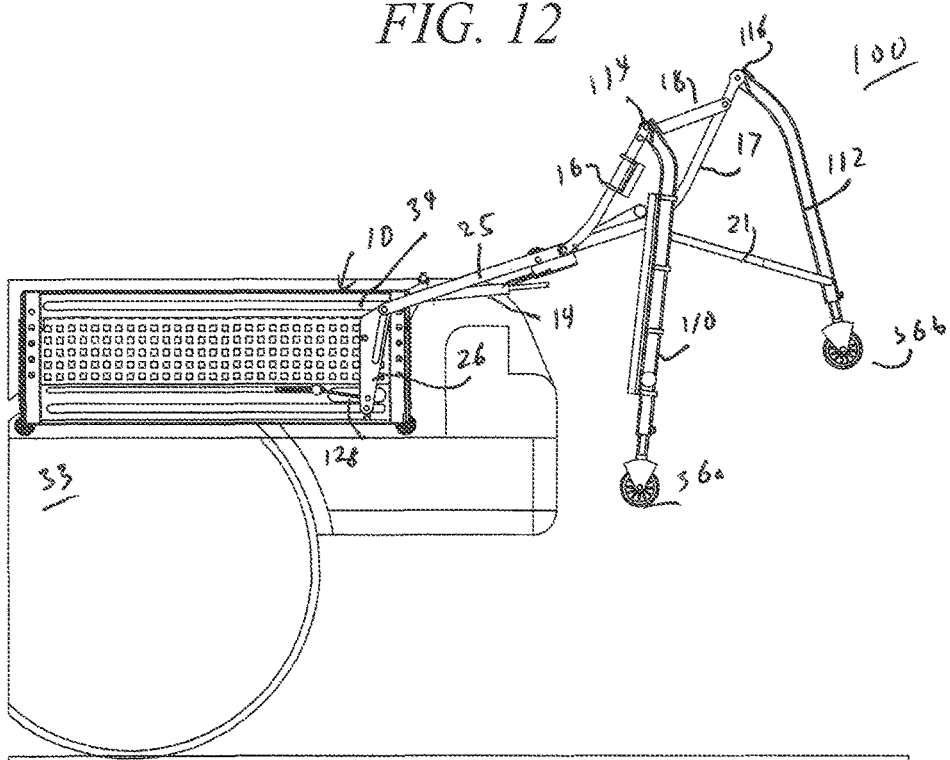
FIG. 13 is a eighth side view of a trunk-accessible folding cart being loaded into a vehicle cargo space, in accordance with some embodiments.
Figure 14:
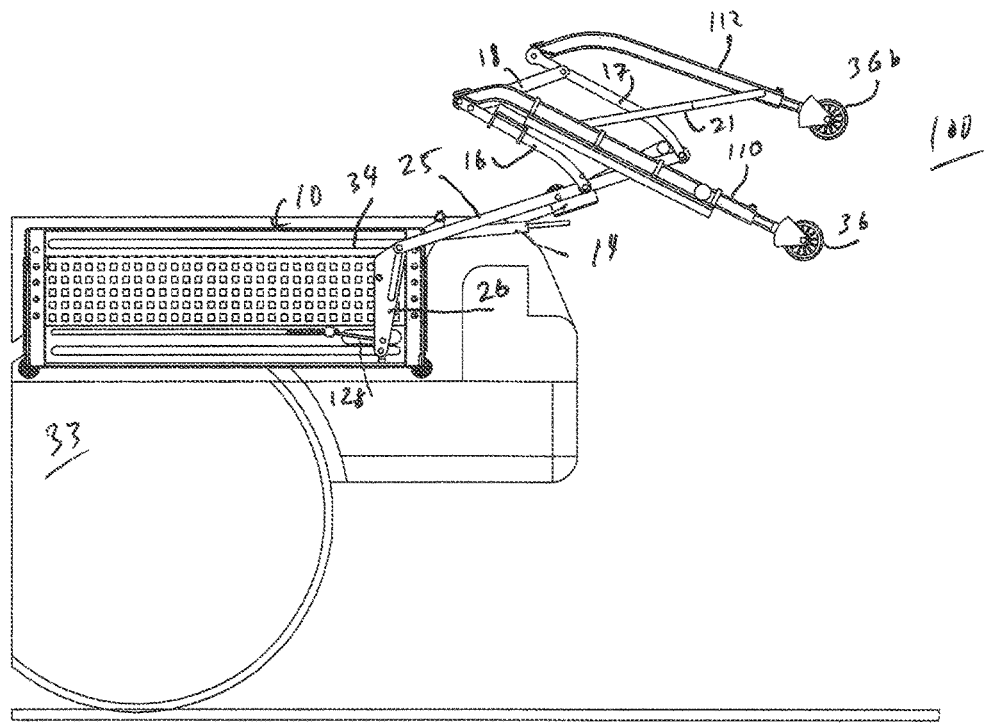
FIG. 14 is a ninth side view of a trunk-accessible folding cart being loaded into a vehicle cargo space, in accordance with some embodiments.
Figure 15:
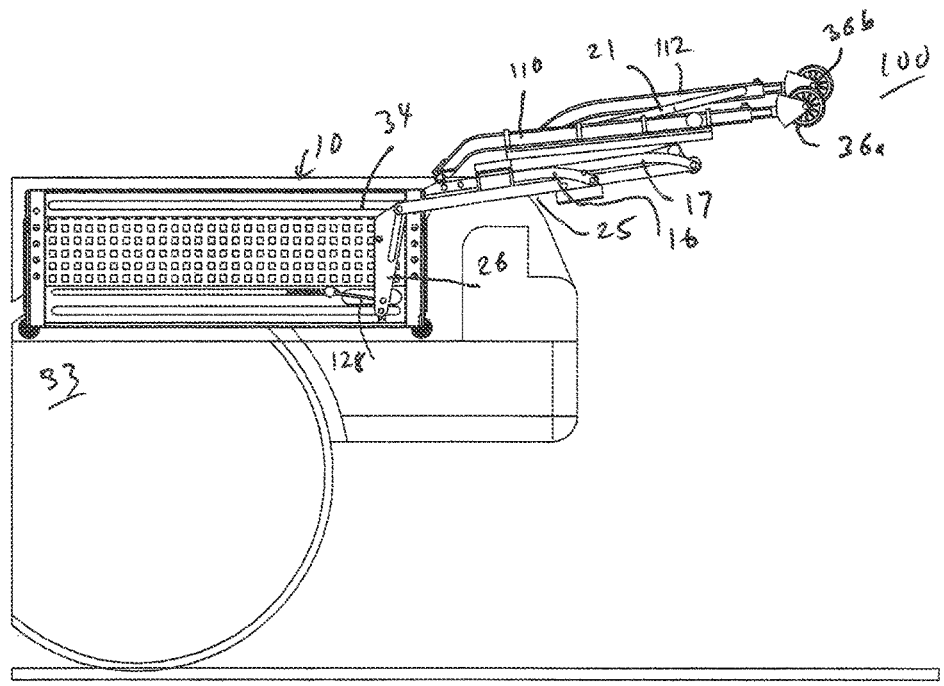
FIG. 15 is a tenth side view of a trunk-accessible folding cart being loaded into a vehicle cargo space, in accordance with some embodiments.
Figure 16:
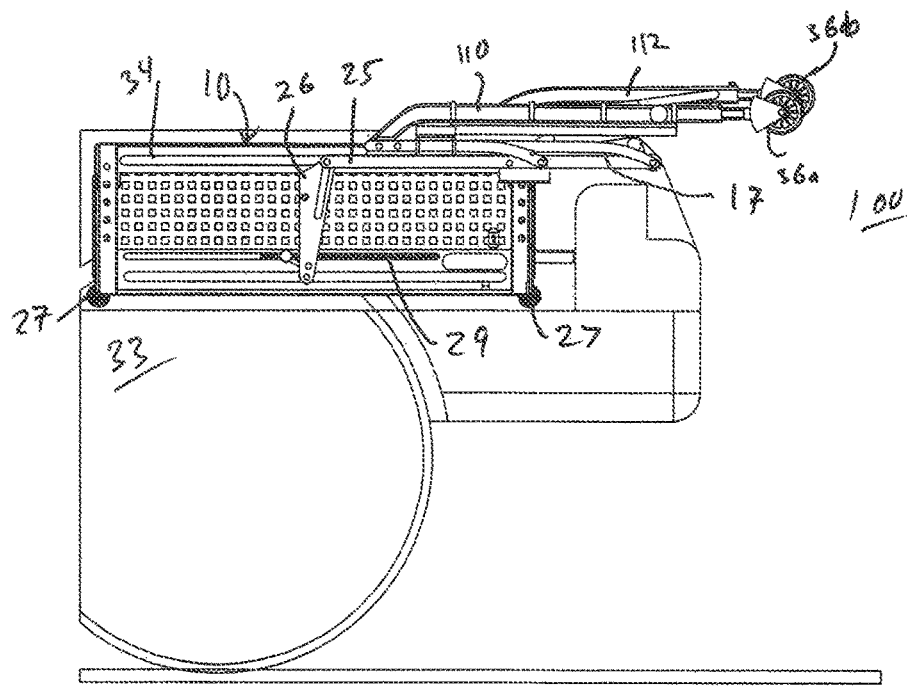
FIG. 16 is a eleventh side view of a trunk-accessible folding cart being loaded into a vehicle cargo space, in accordance with some embodiments.
Figure 17:
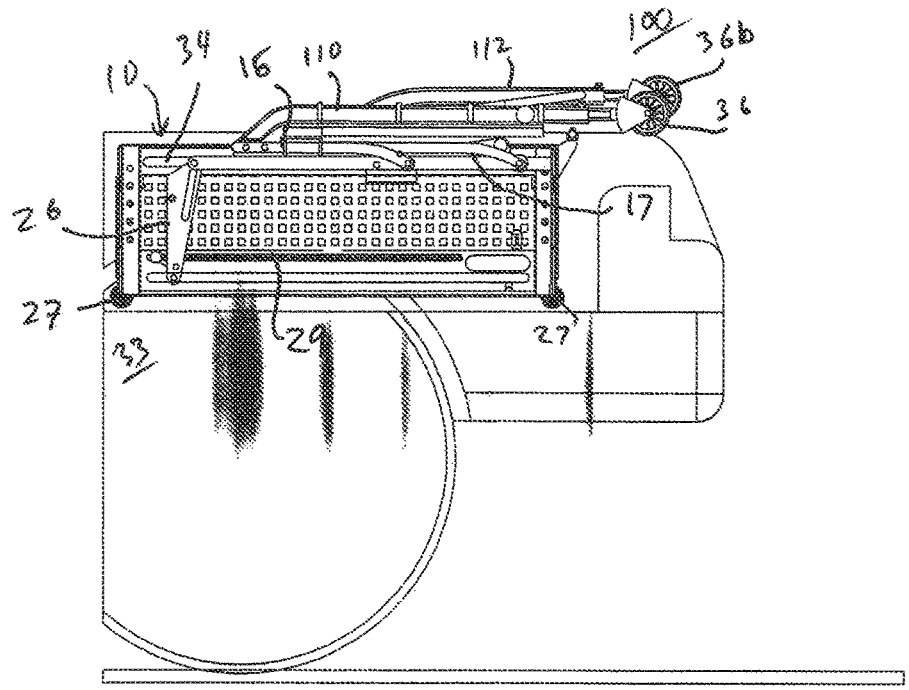
FIG. 17 is a twelfth side view of a trunk-accessible folding cart being loaded into a vehicle cargo space, in accordance with some embodiments.

As mentioned, the basket 10 rests on a set of wheels 108 supported on each side by a respective one of the cantilever horizontal support bar 25. The wheels 108 can ride in tracks formed on the underside of the basket 10 to allow the basket to roll forward and backward (e.g. to the left and right, respectively, in FIG. 2). The basket 10 is locked in place by a pair of spring loaded plunger locks 23, one on other side of the basket 10. The plunger locks 23 hold the basket in place, but they can be released by a user to roll the basket 10 forward. FIGS. 6-17 show various stages of loading the cart 100 into the trunk of a vehicle 33, where the rear of the vehicle is shown in a representative cut-away view. In FIG. 6 the cart 100 is positioned at the rear of a vehicle 33. A pad 24 on the lower portion 110 of the front legs can be used to prevent scratching the paint or surface of the vehicle 33. Since the lower portion 110 of the front legs are angled, and the upper portion 16 of the front legs is located behind the midpoint of the basket 10, the basket hangs over the trunk of the vehicle 33 and protrudes into the space of the trunk. In FIG. 7 the plunger locks 23 can be unlocked to allow the basket 10 to slide forward on wheels 108. As this occurs the springs 29 on each side of the basket 10 are compressed in their respective track by the cables 128 pulling on the sliding blocks 28. The slotted lift arms 26 are still in their original position, and the legs 102, 104 remain fully open. In FIG. 8 the basket 10 is pushed fully forward and tipped down into the trunk of the vehicle 33, pivoting on a front wheel 108, where a front wheel 27 of the basket can make contact with the floor of the trunk. At this point the cable 128 can be seen, and the slotted lift arms 26 begin to swing upwards at their rearward end. In FIG. 9 the basket has passed over the front wheel 108a, which track up the back side of the basket 10, and the slotted lift arm 26 begins to rotate upward, and the axle of front wheel 108a traverses slot 126, and sliding block 28 further compresses spring 29. In FIG. 10 the cantilever horizontal support arm 25, and legs 102, 104 begin to tip forward, with rear caster 36b coming off the ground while front caster 36a remains on the ground. Also, at this point the basket 10 is fully in the trunk of the car and both wheels (front and rear) 27 of the basket 10 are touching the floor of the trunk of the vehicle. The slotted lift arm 26 is fully rotated such that the rear portion is substantially over the front portion of the slotted lift arm 26, and the spring 29 is at maximum compression (for the tension set by tensioners 30, 31). The front wheel 108a, attached to the cantilever horizontal support arm 25, enters into upper track 34. In FIG. 11, the legs 102, 104 have begun being to be folded, with the lower horizontal support arms 20, 21 hinging at their center point and collapsing, allowing the lower front leg 110 to being moving toward the rear lower leg 112. In FIG. 12 the front caster 36a is now off the ground as well, and the upper leg portions 16, 17 begin to come closer as well, as the lower leg portions 110, 112 also continue moving up and closer together as the legs fold. As the leg assembly is slid forward, the other wheels 108 attached to the cantilever horizontal support arm 25 enter into the upper slot track 34 and slide along the upper track 34. In FIG. 17, the upper front leg portion 16 has swung around past upper rear leg portion 17, and the upper portions 16, 17, have begun to pivot at their respective pivot points 114, 116 as the lower leg portions 110, 112 continue folding up. In FIG. 14 lower front leg portion 110 has folded over upper front leg portion 16, and rear lower rear leg portion 112 has folded up over upper front leg portion 17 as the legs collapse over the cantilever horizontal support arm 25. In FIG. 15 the legs are substantially completely folded over the cantilever horizontal support arm 25. In FIGS. 10-15 the spring 29 has remained compressed with the slotted lift arm 26 at its most rearward position. In FIG. 16 the spring 29 begins to decompress, pulling the folded leg assembly over the basket 10. In FIG. 17 the spring 29 is fully decompressed (or as fully decompressed as is allowed by its track), and the folded leg assembly is over the sides of the basket 10, with a pair of front and rear legs 102, 104 on each side of the basket 10. Note that because the legs fold up along the sides of the basket 10, items that were in the basket 10 can remain in the basket 10.

Figure 18:
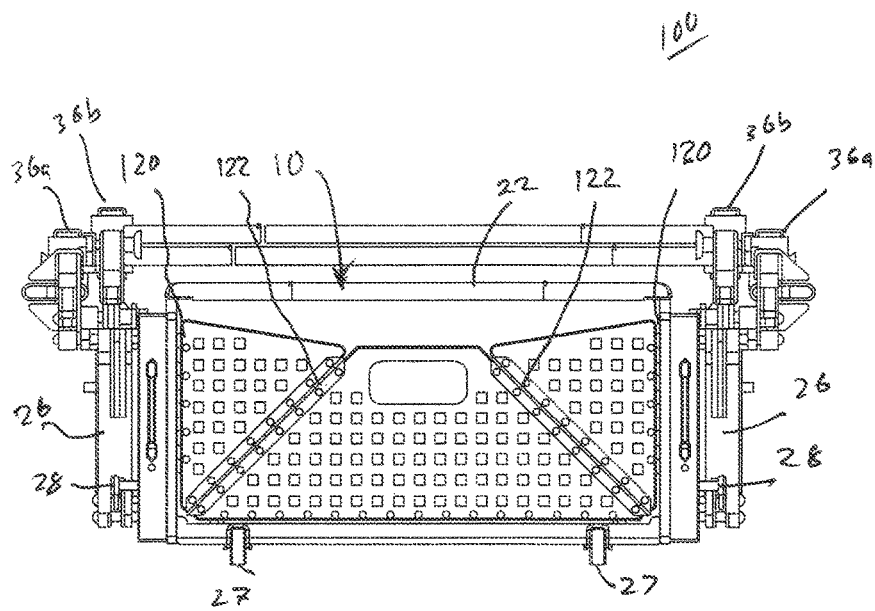
FIG. 18 is a front elevational view of a trunk-accessible folding cart with the legs folded on top of the basket and with the basket open, in accordance with some embodiments.
Figure 19:
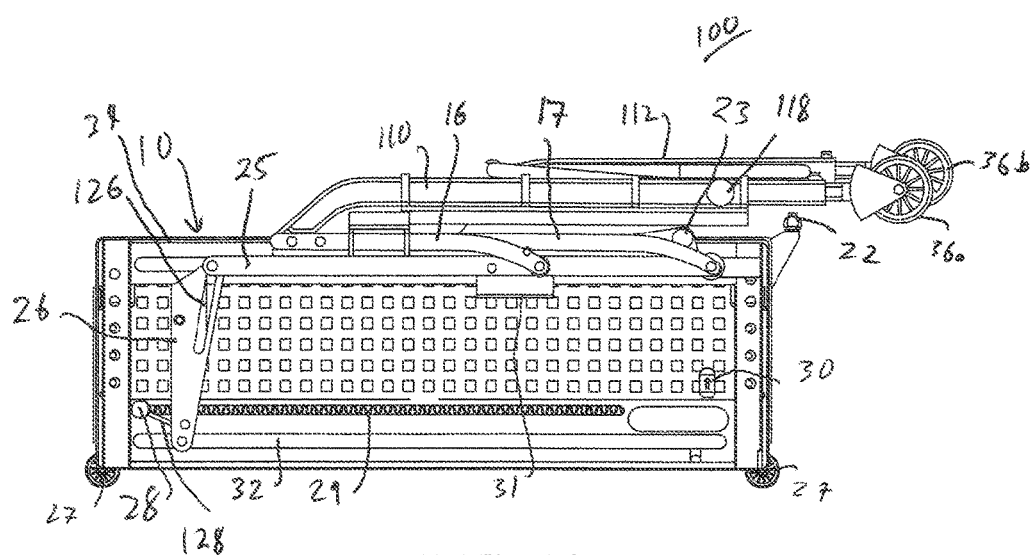
FIG. 19 is a side elevational view of a trunk-accessible folding cart with the legs folded on top of the basket and with the basket open, in accordance with some embodiments.
Figure 20:
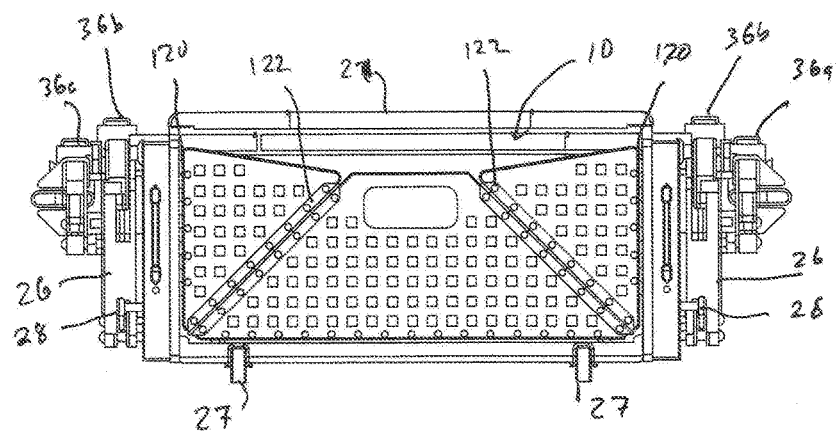
FIG. 20 is a front elevational view of a trunk-accessible folding cart with the legs folded on the side of the basket and with the basket open, in accordance with some embodiments.
Figure 21:
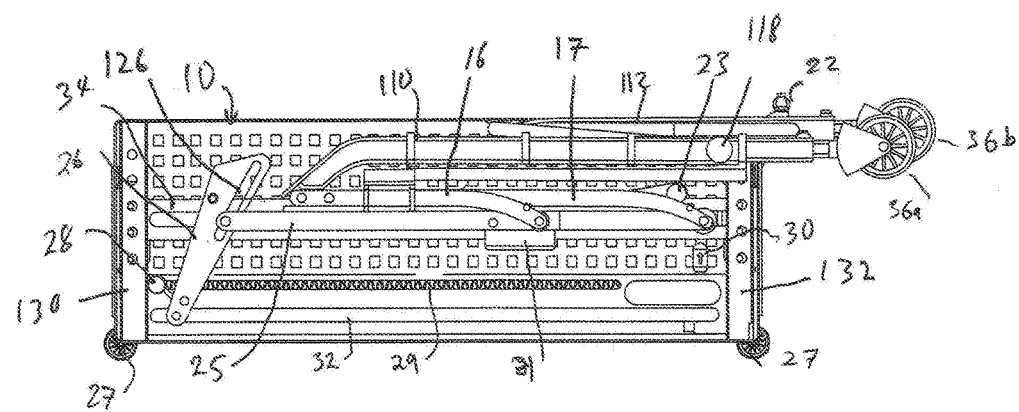
FIG. 21 is a side elevational view of a trunk-accessible folding cart with the legs folded on the side of the basket and with the basket open, in accordance with some embodiments.
Figure 22:
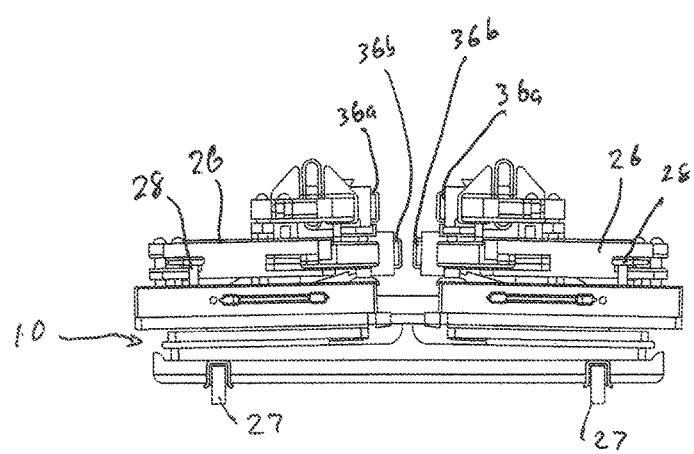
FIG. 22 is a front elevational view of a trunk-accessible folding cart with the legs folded on top of the basket and with the basket folded closed, in accordance with some embodiments.
Figure 23:
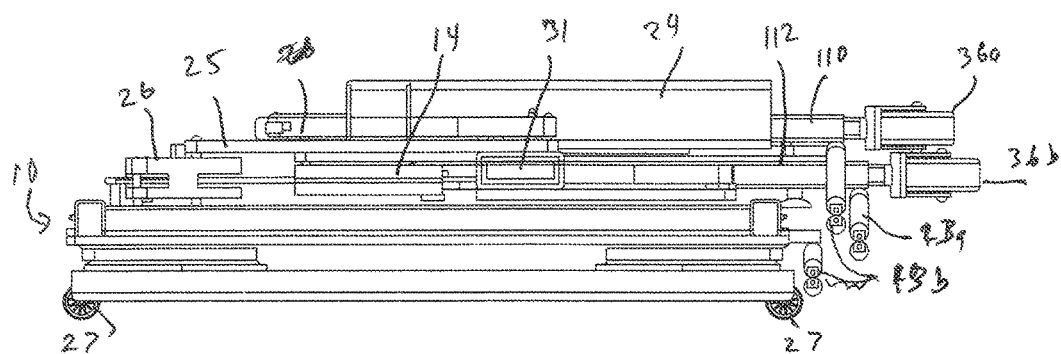
FIG. 23 is a side elevational view of a trunk-accessible folding cart with the legs folded on top of the basket and with the basket folded closed, in accordance with some embodiments.
Figure 24:
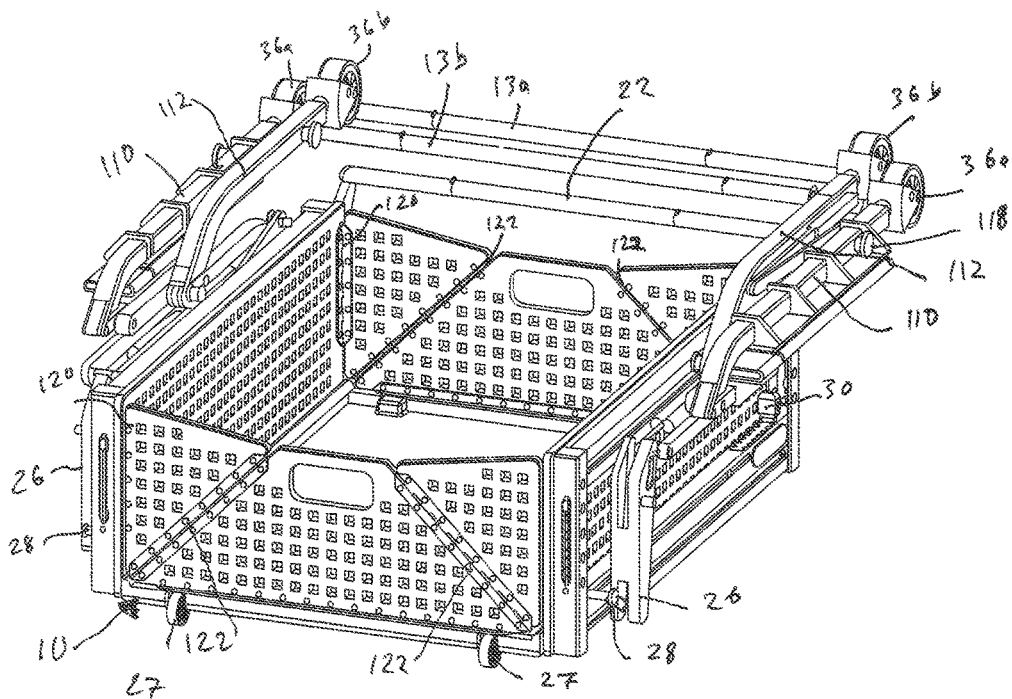
FIG. 24 is an isometric view of a trunk-accessible folding cart with the legs folded on top of the basket and with the basket open, in accordance with some embodiments.
Figure 25:
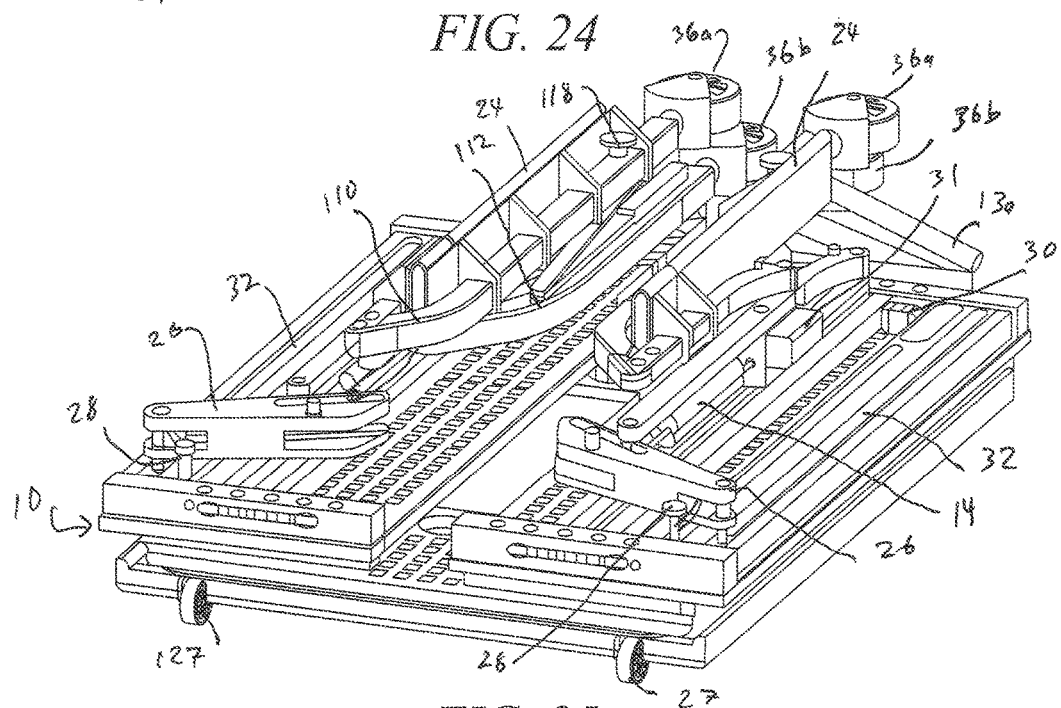
FIG. 25 is an isometric view of a trunk-accessible folding cart with the legs folded on top of the basket and with the basket folded closed, in accordance with some embodiments.

Finally, in FIG. 17, the folded cart with the basket still open can be rolled forward to be fully in the trunk of the vehicle 33. FIGS. 18-19 show front and side elevational views, respectively, of the cart 100 as it would be in FIG. 17, and FIG. 24 shows an isometric view of the folded cart in the state shown in FIGS. 18-19. The cart, although shown open, can include side hinges 120 and angled hinges 122 that connect portions of the front and rear sides of the basket 10 to allow collapsing of the basket. FIGS. 20-21 show front and side elevational views, respectively, of the folded leg assembly pushed down along the sides of the basket 10 in the fully folded state. The upper track 34 is held at each opposite end of the basket 10 by vertical tracks 130, 132 which allow the upper track 34 to move up and down, allowing the legs to be pushed down alongside the sides of the basket 10. If there are no items in the basket 10, then the basket can be folded by virtue of hinges 120, 122, and hinges connecting the left and right sides of the basket 10 to the floor of the basket 10, as shown in FIGS. 22-23, and in isometric view in FIG. 25. The series of steps in FIGS. 6-17 constitute a method of folding and unfolding the cart 100.

The basket 10 can be fabricated primarily of plastic with metal additions for support strength, and is designed to support, in some embodiments, approximately 100 pounds in the basket (compared to the shopping cart maximum weight of 150 pounds). The width of the basket 10 is specifically designed to fit through any-size doorway, and the length of the basket 10 is chosen to fit in most vehicle trunk or cargo areas. Based on these criteria, the basket 10 can have, in some embodiments, dimensions of 22 inches long by 8 inch height by 18 inch width, or approximately 80% the floor area of a standard shopping cart. The primary advantage this design has over the standard shopping cart and any other similar concepts is that the basket 10 has built-in spring-assist mechanism (e.g. spring 29, and connected parts) and a special ability to collapse its legs onto itself, thus allowing the basket 10 to slide into the trunk of a vehicle while the basket 10 is still fully-loaded with contents. This also allows the user to use far less strength than what would normally be needed and can be loaded/unloaded in a much shorter time. The spring-assists work by easing the basket into the trunk and also assist in retrieving the basket when user needs to lift it out of the trunk. The basket 10 is fitted with four undercarriage wheels (two front straight wheels and two rear castor wheels) that allow the user to easily move the basket while in the trunk. When standing, the basket 10 is supported by the cantilever wheels 108 (attached to the cantilever arm 25) and may be of a soft plastic or rubber material, thus acting to dampen any sudden impacts when loading contents.

The support leg assembly consists of a set of front and rear legs 102, 104 that can fold/pivot at the joints (114, 116) into a compact construction. Once collapsed, these legs 102, 14 are stored inside a vehicle's trunk, along the sides of the basket 10. The front legs 102 are separated at the pivot 114 into two members: the front upper leg 16 and the front lower leg 110. The front lower legs 110 extend forward and are acutely angled with the ground, as to maneuver below the vehicle's bumper. This approach allows the basket 10 to extend over the trunk lip (seen in most sedan and compact cars), without the risk of damaging the vehicle's body. The front lower legs 110 are equipped with two front castor wheels 36a (for easy mobility) and two straight wheels 36b on the rear lower legs 112; similar to a standard shopping cart. The lower front legs 110 and rear legs 112 also have a telescoping feature that allows the user to adjust the height of the basket 10 with a range of approximately 8 inches. This design addition allows this cart 100 to be able to enter the trunk of most standard vehicles (including cars, mini-vans, SUVs, etc.) by adjusting the basket height to accommodate for the difference in trunk flooring height relative to the ground. The telescoping legs 102, 104 may have a spring loaded plunger lock, or a similar locking mechanism, to easily unlock and adjust the legs' lengths when needed. Also, the telescoping legs may be designed with a square shaft construction which cannot rotate (as in this case) or may be of a cylindrical shape.

Since the front lower legs 24 and rear lower legs 19 each have a specific angle with the floor (when standing), the spacing of the telescoping locking holes can be calculated so, as the telescoping legs are extended, the basket will maintain its horizontal alignment with the floor. In some embodiments the front lower legs 110 can have an angle of about 50 degrees with respect to the floor, which the rear lower legs can have an angle of about 78 degrees with respect to the floor. By simple trigonometric calculations the position of locking holes along the shafts of the lower leg portions 110, 112 to lock the telescoping portions with respect to each other can be calculated to maintain the horizontal alignment of the basket 10 with respect to the floor.

As the basket 10 is loaded with weighted contents, the weight will be distributed to the six-cantilever wheels 108 contacting the basket's undercarriage These cantilever wheels 108, being directly attached to the two cantilever horizontal support arms 25, apply a downward force to the upper legs 16, 17 of the support leg assembly. The upper front legs 16 and upper rear legs 17 can be designed with a protruding half-inch tab that extends on the inside of the upper legs 16, 17. When the cart is 'standing', this protruding tab contacts the bottom of the cantilever horizontal support arm 25 and restricts the motion of the upper front legs 16 and upper rear legs 17. The protrusion position is a specific distance from the pivot, as to allow for the upper legs to contact the cantilever arm 25 when the upper legs 16, 17 are 'standing', yet still be able to rotate around and over the cantilever arm 25, when being collapsed. Since the cantilever arms 25 are only supported on less than half of its length, a large rotational torque is experienced by the upper front legs 16 and upper rear legs 17. Furthermore, as the basket 10 is extended into the trunk of a vehicle, the rotational torque will drastically increase, as all of the weight will be acting solely on the front cantilever wheel (e.g. 108a). To reduce the possibility of the rear legs rising off the floor, the user may step on the rear cross-member 13b to ensure stable basket entry.

The previously-stated protrusion tabs on each upper leg 16, 17 receive the downward force and rotational torque, and essentially convert the forces into purely-vertical component forces acting on the lower legs 110, 112. To support the downward forces from the weighted basket, the lower legs 110, 112, cross members 18 and support arms 25 work in conjunction to maintain the structural rigidity of the support leg assembly. This is achieved by designing the lower legs 110, 112 and support arms 25 with multiple inline tabs and two spring-loaded locks that restrict the motion of the pivoting legs at points 114, 116. As the legs are being unfolded from the collapsed position, the inline tabs stop the legs' rotation at a specific angle until the spring-loaded lock is engaged at the pivot points 116. The legs may engage automatically due to the weight of the leg assembly, or the user may need to gently push the pivot between the upper rear legs 17 and lower rear legs 112 inward to engage. Once engaged, the leg assembly should maintain its form throughout the loading/unloading process and support the 100-lbs. maximum weight limit.

As described, the basket can be supported horizontally by cantilever arms 25 with three wheels 108 on each arm that directly contact the basket's undercarriage. The cantilever arm 25 is loosely connected to a slotted 'lift' arm 26 that will assist in raising/lowering the basket 10 from the trunk. At its other end, the slotted 'lift' arm 26 is connected to an enclosed wheel 15 that can slide within the 'guiding' track 32 in which the wheel 15 is captured. The purpose of the "guiding' track 32 and multiple wheels are to allow the basket 10 to slide out and away from the support legs, in a cantilever-like manner. This motion allows the basket to extend over the trunk lip for entry into most vehicle trunks.

As the basket moves out and away from the support legs, this creates a downward torque on the cantilever arms 25, and may require the cantilever arms 25 and other specific support legs to have sufficient material area and strength, as to account for the localized stress concentrations, especially when the basket 10 is fully-extended into the trunk and all the weight is supported by the front cantilever wheel 108a. This large torque will be experienced mostly by the front upper leg 16 and lower leg 110. Therefore, these two leg portion 16, 110 and the cantilever arms 25 should be designed with a sufficiently strong construction. The front upper legs 16 and lower legs 110 also have a wide front profile and are covered with a thick padding 24 that can distribute the contact area and dampen the pressure on the bumper of the vehicle into which the cart is being loaded or unloaded. The upper rear legs 17 and lower rear legs 112 are connected by a spring-loaded lockable joint (e.g. at pivot point 116) that is essential to supporting the basket's weight. The front lower legs 110 and rear lower legs 112 also have two cross-member 13a, 13b that maintain the legs' lateral rigidity. The front upper legs 16 and rear upper legs 17 are connected by two horizontal arms 18 that link their motion and position. The front lower legs 110 and rear lower legs 112 are connected by two pivoting support arms, i.e. front support arm 20 and rear support arm 21; one of the arms having a inline tab that butts-up against the other arm and limits the angle of motion/extension at their hinged-midpoint.

When weight is loaded into the basket 10, the front lower legs 110 and the rear lower legs 112 will be experiencing a force pushing them apart from each other, due to their angle with the floor. However, since they are connected by the pivoting support arms 20, 21 and the horizontal arm 18, the front and rear lower legs 110, 112 maintain their relative position and rigidity, and can support the basket's weight. The pivoting support arms 20, 21 also act as a fulcrum (or the pivot point) for the front lower legs 110 and rear lower legs 112. The resulting forces will produce a rotational torque around those connection joints and a resulting compressive force acts on the horizontal arm 18.

As the basket 10 is unlocked and moved forward, the forces and torques acting on the front legs 102 will increase significantly. While all the forces and torques acting on the rear legs 104 should decrease. The weight of the basket may also cause the rear legs 104 to raise off the floor prematurely. The user may only need to step on rear cross-member 13b to keep both legs on the floor. By design of the pivots at lockable joints 114, 116, and front and rear support legs 110, 112, the leg assembly will be locked in the 'standing' position and will maintain its support throughout the trunk-entry process, even with the addition of heavy weight.

Prior to deploying the loaded basket 10 into a vehicle, the user should first adjust the two assistance tensioners that are on either side of the basket, which are the weight assist tensioners 30 and lift assist tensioners 31. These assistance mechanisms work by adjusting the position and tension of two spring assemblies, with each assembly acting at different times during the collapsing process. The weight assist tensioner 30 is essentially an enclosed track with three sliding blocks and springs 29 placed in series. As the basket 10 is slid away from the support legs, the 'weight assist' will be acting first by compressing the springs 29 using the sliding block 28 and cable-and-spring assembly 14. The linear force acting on the basket 10 will be dependent on the spring constant (pounds per inch compressed), spring length, and spring end-position of spring 29. By lifting and sliding the position of the 'weight assist' tensioner 30, the user can easily adjust the linear force applied to basket by essentially moving the end-position of the springs 29. The 'weight assist' locking mechanism may be a spring-loaded plunger or a similar locking mechanism, and should be adjusted based on the weight of the contents and/or strength of user. On the other end of the 'weight assist', the spring 29 is fronted by the sliding block 28 that is allowed to freely move within the enclosed multi-spring track. This sliding block 28 interconnects the 'weight assist' 30 and 'lift assist' tensioner 31, and is the anchor arm for the 'lift assist' cable-and-spring assembly 14.

The "lift assist" is composed of extension springs connected on either end by a short and long cable 128. The cable 128 is attached to rearward end of the extension spring and connects to the 'lift assist' tensioner 31. The 'lift assist' strength can be adjusted by the user based on the level of assistance needed. This mechanism may be a slide, squeeze or similar action, but its purpose is to provide more or less slack for the cable-and-spring assembly 14. The cable-and-spring assembly 14 can also be equipped with a sheathing that covers the extension spring and a portion of the cable 108, and protects the user from possible injury. The long cable 108 is attached to the frontward end of the extension spring and travels thru a gap in the slotted 'lift' arm 26. It exits the slotted arm 26 between two perpendicular rods and connects to the anchoring arm of the sliding block 28. The slotted 'lift' arm 26 is also equipped with a protruding tab that extends toward the exterior of the cart and restricts the upward motion of the slotted 'lift' arm 26. The slotted 'lift arm' 26 may be designed with a sliding ability or a fixed pivot. However, this design allows it to slide closer to the front of basket during 'standing' so a longer cantilever arm 25 can be used in the support leg assembly and allows for a longer spring-extension range for the 'lift assist' cable-and-spring assembly 14.

The tensions/positions of the sliding block 28, 'weight assist' 30, and 'lift assist' 31, will determine the strength of assistance supplied by the cart. Once the 'weight assist' and 'lift assist' 30, 31 has been adjusted to the desired setting, the user only needs to unlock the basket locking mechanism 23 to extend the basket out and away from the support legs. The basket lock 23 may be a spring-loaded plunger or a similar mechanism, and may be designed with a chamfer (i.e. angled edge) on the frontward facing side of the plunger and on the rear of the basket. These chamfers allow the spring-loaded plunger to be compressed easily as the basket is pulled up to the lock.

As the user goes through the process of collapsing the cart (e.g. FIGS. 6-17), the support legs will be folded onto itself in an easy and compact form. The upper and lower legs 16, 17 and 110, 112, respectively, will all fold parallel to each other, and their corresponding cross-members 13a, 13b will lie near the handle bar 22, without impeding the basket's contents. The telescoping wheels 36a, 36b may protrude slightly past the handle bar in the folded position, however, the basket has undercarriage wheels that enable the basket to be maneuvered deeper into the trunk, if needed. The front and rear support arms 20, 21 are situated between the front and rear legs and lie flat within the four leg portions 110, 112 (each side). The support arms 20, 21 are each designed with a specific length that enable them to fold down flush with the legs 110, 112, otherwise they would be pointing upward or downward when collapsed.

To begin folding the basket 10 inward, the user will need to slide the upper guide track 34 downward, via the two vertical sliding tracks 130, 132 that are designed along the front and rear of the basket 10. The upper track 34 can be locked in place in the vertical tracks 130, 132 by locking plunger mechanisms. By doing so, the collapsed leg assembly will no longer be protruding over the basket's top and will reduce the basket height. As the legs slide down, the front and rear cross-members will slide past the three-piece handle bar 22 and will be situated below it. This process will also completely loosen all tension in the cable-and-spring assembly 14.

A feature of some embodiments is the design to "break" and fold a straight bar into multiple pieces. In this case, the handle bar 22 and front and rear cross-members 13*a*, 13*b* can be folded since they are connected to the side panels and leg assembly at fixed distances. An alternative approach is to make those three straight bars removable during storage. In some embodiments the cart 100 can use four-pivots and a three-piece bar assembly, as a replacement for each of the single-piece straight bars. Each of the three folding bar assemblies can pivot at four locations which allow them to collapse tightly below the telescoping wheels without extending too far below the bottom panel. Each bar assembly is also equally spaced from the others so when the basket is being closed, they can fold downward without contacting any other parts. Since the handle bar is connected to the side panels via two support brackets, the front and rear cross-members 20, 21 can lie 'outside' of the handle bar. For the front and rear cross-members 20, 21, the three-piece bar assemblies can have a range of dimensions to successfully fold below the telescoping legs, just as long as the overall 'straight' length is correct. To correctly fold the handle bar, dimensions can be determined that will allow the handle bar to fold compactly on-top of itself, with the ends nearly touching in the middle.

As the user unfolds the basket 10 from a closed position, the handle bar 22 and cross-member assemblies 20, 13*a*, 13*b* will begin to straighten, until the basket 10 is nearly fully open and the bars slightly bent. At this time, the user will need push all three bar assemblies upward, which will completely open the basket and also lock the bar assemblies into its "straight" configuration. While in this straight configuration, the four-pivots that are located on either side of the middle member can tuck into two small recesses in the left- and right-members and allow the members to contact each other, eliminating the gaps in the straight bar configuration and reducing the possibility of pinching the user's skin while in use.

Accordingly, the disclosed collapsible trunk-accessible cart provides several benefits, including the ability to easily load and unload the cart with items contained therein, without an undue assembly. The cart includes sprung assistance systems that assist in loading and folding the legs of the cart into the trunk or cargo area of a vehicle. When the basket contains no items, it can be folded even more by folding the sides of the basket down.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. As used here, the terms "vertical" and "horizontal" refer to the orientation of elements described with those terms when the apparatus is normally operated. If the apparatus is turned on its side, for example, even though an element that was "horizontal" when the apparatus was normally operated may then be in a vertical orientation with respect to the floor or ground, the element is still referred to as a "horizontal" element as that is its normal operating orientation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A collapsible trunk-accessible cart, comprising:
   a basket having a bottom, and front, back, left, and right sides that rise vertically from the bottom;

a pair of cantilever horizontal support arms disposed on the right and left sides of the basket, with one of the cantilever horizontal support arms on each of the left and right sides of the basket;

each cantilever horizontal support arm having at least a front wheel and a rear wheel attached at a front portion and a rear portion, respectively, of the cantilever horizontal support arm, wherein the wheels support the basket when the collapsible trunk-accessible cart is in an open configuration, and wherein the basket can roll forward and backward on the wheels;

a pair of front legs, each including an upper portion pivotally attached to a respective one of the cantilever horizontal support arms at a point behind a midpoint of the respective cantilever horizontal support arm and extending downward to a lower portion that is pivotally connected to a lower end of the upper portion and which extends down and forward at an angle, each lower portion terminated with a respective wheel;

a pair of rear legs, each including an upper portion pivotally attached at area point of a respective one of the cantilever horizontal support arms and extending downward and pivotally connected to a respective lower portion that extends further downward and terminates with a respective wheel;

a pair of slotted lift arms, each mounted on a respective side of the basket, and having first end pivotally attached to a track wheel disposed in a horizontal track on the respective side of basket, and having a second end including a slot through which an axle for the front wheel attached to the respective cantilever horizontal support arm passes; and a pair of springs, each one mounted in a respective horizontal track on one of the left and right sides of the basket, and having a respective sliding block mounted at a forward end of each spring; and a pair of lift assist assemblies, each respectively disposed on one of the left and right sides of the basket, and which are attached by a respective cable system that extends around the respective slotted lift arm to the respective sliding block and to a respective one of the cantilever horizontal support arms;

wherein the cantilever horizontal support arms, slotted lift arms, springs, and lift assemblies are configured to allow the basket to be rolled forward over the front wheel of the cantilever horizontal support arms while retaining the cantilever horizontal support arms and the front and rear legs with the basket, and wherein the front and rear legs fold their respective lower portions over their respective upper portions horizontally over the respective sides of the basket.

2. The collapsible trunk-accessible cart of claim 1, further comprising at least one plunger lock to lock the basket in place over the front and rear legs on the cantilever horizontal support arms.

3. The collapsible trunk-accessible cart of claim 1, wherein the lower portions of each of the front and rear legs further comprise a locking telescoping element that can be configured to raise or lower a height of the basket.

4. The collapsible trunk-accessible cart of claim 1, further comprising a pair of upper horizontal tracks, each one on an outside of each of the left and right sides of the basket, wherein the wheels attached to the cantilever horizontal support arms are slid into the respective upper track upon folding the front and rear legs over the respective sides of the basket.

5. The collapsible trunk-accessible cart of claim 4, wherein the upper tracks are each mounted in a pair of opposing vertical tracks on each respective side of the basket which allow the respective upper tracks to move up and down.

6. The collapsible trunk-accessible cart of claim 1, wherein the basket the front, rear, left, and right sides of the basket are hinged and thereby collapsible over the floor of the basket upon the front and rear legs being folded over the respective sides of the basket.

7. The collapsible trunk-accessible cart of claim 1, further comprising a pair of weight assist tensioners that each adjust a position or tension of a respective one of the springs on each of the left and right sides of the basket.

8. The collapsible trunk-accessible cart of claim 1, further comprising a pair of horizontal arms, each respectively connected between the lower ends of the lower portions of the front and rear legs.

9. The collapsible trunk-accessible cart of claim 1, further comprising a pair of support arms, each connected between the lower ends of respective ones of the lower portions of the left and right front and rear legs, and wherein the support arms are hinged along a length to fold upon the front and rear legs being folded.

10. The collapsible trunk-accessible cart of claim 1, further comprising a front crossbar connected between lower ends of the lower portions of the front legs, and a rear crossbar connected between lower ends of the lower portions of the front legs, and wherein the front and rear cross bars are sectioned and fold upon the front and rear legs being folded.

11. The collapsible trunk-accessible cart of claim 1, further comprising a handbar connected to a top of the rear side of the basket, wherein the handbar is sectioned to fold upon the front and rear legs being folded.

12. The collapsible trunk-accessible cart of claim 1, wherein the front legs each comprise a tab that stops further rotation of the lower portion with respect to the upper portion upon the front legs being fully unfolded.

13. The collapsible trunk-accessible cart of claim 1, wherein the rear legs each comprise a locking mechanism to lock the lower portion to the upper portion when the rear legs are fully unfolded.

14. The collapsible trunk-accessible cart of claim 1, wherein the lower portions of the front legs extend downward and forward at an angle of substantially 78 degrees with respect to the bottom of the basket when the front legs are fully unfolded.

15. The collapsible trunk-accessible cart of claim 1, wherein the front legs have a width between them that is wider than a width between the rear legs.

16. The collapsible trunk-accessible cart of claim 1, wherein the lower portions of the front legs each have pad disposed on a front of the lower portions.

* * * * *